United States Patent
Shimada et al.

(10) Patent No.: US 6,407,183 B1
(45) Date of Patent: Jun. 18, 2002

(54) CASTING FROM EPOXY RESIN AND ANHYDRIDE (PARTIAL ESTER)

(75) Inventors: Katsumi Shimada; Yutaka Aoki, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 16 days.

(21) Appl. No.: 09/638,909

(22) Filed: Aug. 15, 2000

(30) Foreign Application Priority Data

Aug. 24, 1999 (JP) .......................................... 11-236409

(51) Int. Cl.[7] .......................... C08L 63/00; C08L 67/00; C08G 59/42
(52) U.S. Cl. ..................... 525/524; 525/438; 525/488; 525/501; 525/504; 525/508; 525/533
(58) Field of Search ................................ 525/438, 533, 525/488, 501, 504, 508, 524

(56) References Cited

U.S. PATENT DOCUMENTS

| | | | | |
|---|---|---|---|---|
| 4,043,969 A | * | 8/1977 | Sporck | 523/466 |
| 4,178,274 A | * | 12/1979 | Denk et al. | 523/455 |
| 4,565,859 A | * | 1/1986 | Murai et al. | 528/365 |
| 4,576,896 A | * | 3/1986 | Suzuki et al. | 428/413 |
| 4,942,215 A | * | 7/1990 | Greco et al. | 528/114 |

FOREIGN PATENT DOCUMENTS

| | | | |
|---|---|---|---|
| JP | 61-85433 A | * | 5/1986 |
| JP | 62-164675 A2 | * | 7/1987 |

* cited by examiner

Primary Examiner—Robert E. L. Sellers
(74) Attorney, Agent, or Firm—Sughrue Mion, PLLC

(57) ABSTRACT

An epoxy resin composition having a viscosity of from 50 to 400 P at 25° C. is disclosed. The composition provides by casting a resin plate, particularly a transparent resin plate for a liquid crystal display, which has satisfactory thickness precision.

7 Claims, 1 Drawing Sheet

CASTING FROM EPOXY RESIN AND ANHYDRIDE (PARTIAL ESTER)

FIELD OF THE INVENTION

This invention relates to an epoxy resin composition for producing a resin plate by casting, a resin plate and a transparent resin plate for liquid crystal displays which are obtained by curing the epoxy resin composition, and a liquid crystal display comprising the transparent resin plate.

BACKGROUND OF THE INVENTION

The transparent resin plate of a liquid crystal cell of a liquid crystal display (hereinafter "LCD") has been made of thermoplastic resins or thermosetting resins as a substitute of glass. Thermosetting resins have been preferred for their heat resistance, optical anisotropy, and the like. The thermoplastic resins for this use mainly include liquid epoxy resins, which are cast molded to produce the resin plate.

Since cast molding has low production efficiency and is unsuited to large-volume production, it has been demanded to improve the production efficiency by adopting casting, which comprises spreading a liquid resin on a smooth endless belt made of stainless steel to produce sheeting in a continuous manner. However, where a conventional liquid epoxy resin that has been used in cast molding is applied to casting, the resin, having a low viscosity, flows more than needed to result in considerable variation in thickness of resulting sheeting. Thickness variation of a transparent resin plate used in an LCD causes fatal defects of display functions, such as color unevenness or luminous intensity unevenness.

Besides, casting has been employed for making sheeting of thermoplastic resins. There has been no report on production of an epoxy resin plate by casting. Conventional epoxy resin compositions include the above-described low-viscosity liquid ones which are used in cast molding, potting or printing and solid ones having no flowability at room temperature which are used as a transfer molding material for, for example, sealing of semiconductor devices, but an epoxy resin composition suitable for manufacturing resin plates by casting is unknown.

SUMMARY OF THE INVENTION

An object of the present invention is to provide an epoxy resin composition which can be cast to produce a resin plate and a transparent resin plate for an LCD (hereinafter inclusively referred to as a resin plate) which have satisfactory thickness precision.

Another object of the invention is to provide a resin plate produced from the epoxy resin composition.

Still another object of the invention is to provide an LCD having the transparent resin plate.

The above objects of the invention are accomplished by an epoxy resin composition whose viscosity at 25° C., is from 50 to 400 P (poise).

The epoxy resin composition according to the present invention provides by casting a resin plate with markedly improved thickness precision. A transparent resin plate prepared by casting the epoxy resin composition provides an LCD exhibiting excellent display characteristics.

DETAILED DESCRIPTION OF THE INVENTION

Figure 1:
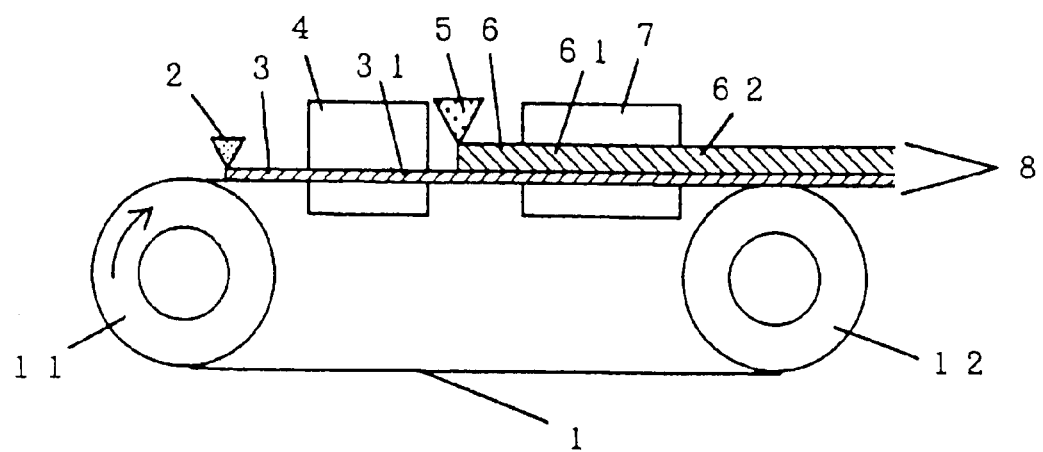
FIG. 1 schematically shows a system used to produce a resin plate by casting the epoxy resin composition of the present invention.

The epoxy resin composition according to the invention has a viscosity of 50 to 400 P, preferably 75 to 150 P, at 25° C. If the viscosity is smaller than 50 P, the resin composition flows unnecessarily on a stainless belt only to provide a plate with thickness variation. If the viscosity is greater than 400 P, the resin composition has deteriorated casting workability or entraps air bubbles, which result in poor appearance. The viscosity is usually measured with an E-type rotational viscometer (cone and plate type rotational viscometer).

The epoxy resin composition of the invention can be obtained by properly combining (A) an epoxy resin and (B) an acid anhydride type curing agent.

The epoxy resin as component (A) is not particularly limited, and any known epoxy resins, whether solid or liquid at room temperature (25° C.), can be used.

The epoxy resins that are solid at room temperature are not particularly limited and include, for example, bisphenol A epoxy resins, bisphenol F epoxy resins, phenolic novolak epoxy resins, cresol novolak epoxy resins, alicyclic epoxy resins, and nitrogen-containing cyclic epoxy resins such as triglycidyl isocyanurate and hydantoin epoxy resins, hydrogenated bisphenol A epoxy resins, aliphatic epoxy resins, glycidyl ether type epoxy resins, bisphenol S epoxy resins, biphenyl type epoxy resins which cure to provide low water-absorption cured products, bicyclic epoxy resins, and naphthalene type epoxy resins. These epoxy resins can be used either individually or as a combination thereof. Where transparency and resistance to color change are required of a cured product such as a resin plate for an LCD, preferred of them are bisphenol A epoxy resins, bisphenol F epoxy resins, alicyclic epoxy resins, and triglycidyl isocyanurate. Inter alia, alicyclic epoxy resins represented by formula (II) shown below are still preferred.

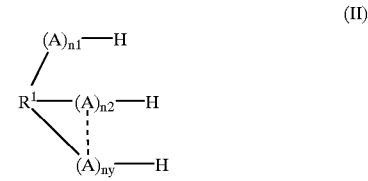

(II)

wherein $R^1$ represents an organic compound residue having y active hydrogen atoms; $n_1$, $n_2$ ... and $n_y$ each represent an integer of from 0 to 100, totalizing up to 1 to 100; y represents an integer of from 1 to 100; and A represents a substituted cyclohexane skeleton having a structure:

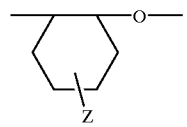

wherein Z represents

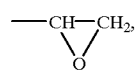

—CH=CH$_2$ or —CH(OH)—CH$_2$OR$^2$, and R$^2$ represents a hydrogen atom, an alkyl group, a carboalkyl group or a carboaryl group, provided that formula (II)

contains at least one

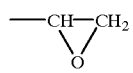

group.

Of the epoxy resins that are solid at room temperature, those having an epoxy equivalent of 90 to 1000 and a softening point of 160° C. or lower are preferred. Those having an epoxy equivalent smaller than 90 tend to provide a brittle cured product, and those having an epoxy equivalent exceeding 1000 tend to provide a cured product having a low glass transition temperature (hereinafter "Tg").

The epoxy resins that are liquid at room temperature which can be used in the present invention are not particularly limited and include, for example, bisphenol A epoxy resins, bisphenol F epoxy resins, alicyclic epoxy resins, hydrogenated bisphenol A epoxy resins, aliphatic epoxy resins, glycidyl ether epoxy reins, and bisphenol S epoxy resins. They can be used either individually or as a combination thereof. For use as a transparent plate for LCD's preferred of these epoxy resins are bisphenol A epoxy resins, bisphenol F epoxy resins, and alicyclic epoxy resins in view of the color change resistance of their cured products. In particular, an alicyclic epoxy resin represented by formula (III) shown below is preferred.

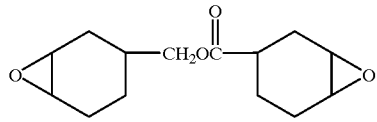

(III)

The epoxy resins which are liquid at room temperature which are generally used in the invention usually have an epoxy equivalent of 90 to 950.

In order for the epoxy resin composition to have a viscosity of 50 to 400 P at 25° C., the epoxy resin as component (A) preferably comprises the epoxy resin that is solid at room temperature in a proportion of 25 to 70% by weight, particularly 35 to 60% by weight. Where the epoxy resin that is solid at room temperature is present in a prescribed proportion, a viscosity effect is manifested, and an abrupt reduction of viscosity with a temperature rise is suppressed in casting and in heat curing after casting so that the plate thickness can be controlled precisely and continuously.

The acid anhydride type curing agent as component (B) includes acid anhydrides and partially esterified acid anhydrides.

The acid anhydrides preferably have a molecular weight of about 140 to 200. Examples of such acid anhydrides are phthalic anhydride, maleic anhydride, trimellitic anhydride, pyromellitic anhydride, hexahydrophthalic anhydride, tetrahydrophthalic anhydride, methylnudic anhydride, glutaric anhydride, methylhexahydrophthalic anhydride, and methyltetrahydrophthalic anhydride, which are colorless to pale yellow. These acid anhydride can be used either individually or as a combination of two or more thereof. Preferred of them are phthalic anhydride, hexahydrophthalic anhydride, tetrahydrophthalic anhydride, and methylhexahydrophthalic anhydride.

The partially esterified acid anhydride is obtained by esterifying part of the acid anhydride groups of the aforementioned acid anhydride with an alcohol according to the following reaction formula:

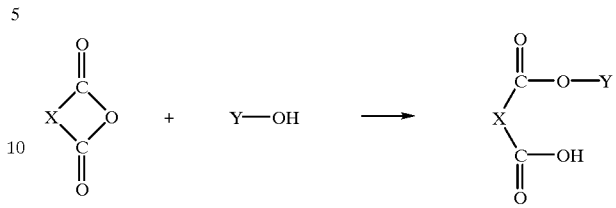

wherein X and Y each represent an arbitrary organic group.

In order to form a uniform resin plate, it is desirable for the epoxy resin composition for casting to have an increased reaction rate so as to moderately shorten the time during which the composition has a low melt viscosity in curing. For this purpose, it is generally preferred that the partial esterification reaction be carried out at a hydroxyl group (of alcohol) to acid anhydride group equivalent ratio of 0.1 to 0.6. With a greater equivalent ratio than 0.6, the resulting resin plate tends to fail to have satisfactory heat resistance.

While the alcohol used in the partial esterification may be either monohydric or polyhydric (inclusive of dihydric). Examples of suitable monohydric alcohols are methyl alcohol, ethyl alcohol, propyl alcohol, butyl alcohol, phenol, benzyl alcohol, allyl alcohol, cyclobutanol, cyclopentanol, and cyclohexanol. Examples of suitable dihydric alcohols are ethylene glycol, triethylene glycol, propylene glycol, dipropylene glycol, hydroquinone, catechol, and resorcinol. Examples of suitable tri- or higher polyhydric alcohols are glycerol, pyrogallol, pentitol, and hexitol. Di- or higher polyhydric alcohols are preferred to monohydric ones because they do not sublimate on heating and do not cause reduction of heat resistance of the resulting cured product. Further, cyclic alcohols are preferred to acyclic ones. Cyclic di- or higher polyhydric alcohols are particularly preferred.

Examples of cyclic monohydric alcohols are phenol, benzyl alcohol, cyclobutanol, cyclopentanol, and cyclohexanol. Examples of cyclic di- or higher polyhydric alcohols include hydroquinone, catechol, resorcinol, pyrogallol, hydroxyhydroquinone, phloroglucinol, p-dihydroxycyclohexane, o-dihydroxycyclohexane, m-dihydroxycyclohexane, 1,2,3-trihydroxycyclohexane, 1,2,4-trihydroxycyclohexane, 1,3,5-trihydroxycyclohexane, phenol novolak, cresol novolak, and a compound represented by formula (I):

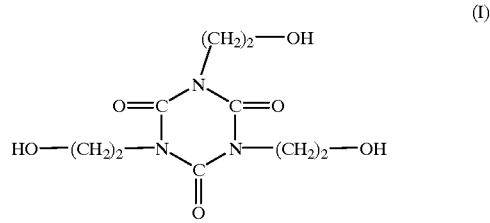

(I)

The above-enumerated alcohols can be used either individually or as a combination of two or more thereof. The cyclic compound of formula (I) is the most preferred of them from the standpoint of heat resistance and transparency of the resulting resin plate.

One or more of other known curing agents can be used in addition to or in place of the above-described acid anhydride type curing agents. The other curing agents include amine curing agents, phenolic curing agents, and carboxylic acid curing agents (e.g., hexahydrophthalic acid, tetrahydrophthalic acid and methylhexahydrophthalic acid). Use of a carboxylic acid in combination with the acid anhydride type curing agent accelerates curing to improve the efficiency in resin plate production.

The epoxy resin as component (A) and the acid anhydride type curing agent as component (B) are preferably compounded at such a ratio that the amount of the acid anhydride group in component (B) may range from 0.5 to 1.5 equivalents, particularly from 0.7 to 1.2 equivalent, per epoxy equivalent of component (A). If the amount of the acid anhydride group is less than 0.5 equivalent, the epoxy resin composition tends to have a reduced curing rate, and the resulting cured product tends to have a reduced Tg. On the other hand, if it exceeds 1.5 equivalents, the resulting cured product tends to have reduced moisture resistance.

The above-specified acid anhydride group to epoxy group equivalent ratio applies to cases where the acid anhydride type curing agent is used in combination with the above-described other curing agents.

If desired, the epoxy resin composition can further comprise appropriate amounts of appropriate additives customarily used in the art, such as cure accelerators, deterioration preventive agents, modifiers, coupling agents, leveling agents, parting agents, dyes, and pigments.

The cure accelerators include, but are not limited to, tertiary amines, such as 1,8-diaza-bicyclo(5.4.0)undecene-7 and triethylenediamine; imidazole compounds, such as 2-ethyl-4 -methylimidazole and 2-methylimidazole; phosphorus compounds, such as triphenylphosphine, tetraphenylphosphonium tetraphenylborate, tetra-n-butylphosphonium o,o-diethylphosphorodithioate; quaternary ammonium salts; organometallic salts; and derivatives thereof. The cure accelerators can be used either individually or as a combination of two or more thereof. Of these cure accelerators preferred are the tertiary amines, the imidazoles, and the phosphorus compounds. The phosphorus compounds are particularly preferred for obtaining cured products which are transparent, tough, and free of coloration.

Where necessary, the cure accelerator can be microcapsulated so as to prevent sudden progress of curing of the epoxy resin composition in casting thereby to suppress a viscosity increase and eventually to prevent thickness defects and appearance defects of the resin plate. Microcapsulation of the cure accelerator is especially advantageous in case where the epoxy resin composition is preheated before casting. Useful encapsulants include cured epoxy resins, polystyrene, polymethacrylic acid, ethylene-vinyl acetate copolymers, polyurea resins, and polyurethane resins.

The cure accelerator is preferably used in an amount of 0.01 to 8.0% by weight, particularly 0.1 to 3.0% by weight, based on the epoxy resin (component (A)). In an amount less than 0.01% by weight, the cure accelerator may fail to produce sufficient cure acceleration effect. In an amount more than 8.0% by weight, the cure accelerator tends to cause color change of the cured product.

The deterioration preventive agents include phenolic compounds, amine compounds, organosulfur compounds, and phosphine compounds, which are known in the art.

The modifiers include known ones, such as glycols, silicones, and alcohols.

The coupling agents include those known in the art, such as silane coupling agents and titanate coupling agents.

The epoxy resin composition of the invention is prepared by, for example, mixing components (A) and (B) and, according to necessity, conventional additives, such as a cure accelerator, a deterioration preventive agent, a modifier, a coupling agent, a leveling agent, a parting agent, a dye, a pigment, and the like in a predetermined ratio, and the resulting mixture is kneaded while, if desired, heating.

In order to obtain a resin plate having satisfactory heat resistance, the compounding ratio of components (A) and (B) can be selected appropriately so that the resulting resin composition may have a Tg of 150° C. or higher, preferably 180° C. or higher.

The resin plate according to the present invention may be transparent or opaque. The term "transparent" as used herein means that the resin plate having a thickness of 0.4 mm has a light transmission percentage of 60% or more, preferably 80% or more, at a wavelength of 600 nm as measured with a spectrophotometer.

The process for producing a resin plate by casting the epoxy resin composition of the invention will be described by referring to FIG. 1. In FIG. 1, a stainless steel endless belt 1 is run around a driving drum 11 and a follower drum 12 at a constant speed, e.g., of 0.1 to 10 m/min, preferably 0.2 to 5 m/min. A resin solution 3 which is easily releasable from stainless steel is applied on the running endless belt 1 through a die 2 and dried or, if necessary, cured by heat application or irradiation to form a resin layer 31. In the embodiment shown in FIG. 1, the resin solution 3 is cured through an ultraviolet irradiation unit 4.

The resin easily releasable from stainless steel includes urethane resins, acrylic resins, polyester resins, polyvinyl alcohol, ethylene-vinyl alcohol copolymers, vinyl chloride resins, vinylidene chloride resins, polynorbornene resins, polycarbonate resins, and polyarylate resins.

An epoxy resin composition 6 according to the present invention is then applied on the resin layer 31 through a die 5 to form a resin layer 61. The resin layer 61 is then cured through a suitable curing unit 7 (e.g., a heating unit or an irradiation unit) to form a continuous resin plate 8 composed of a cured resin sheet 62 adhered to the resin layer 31, which is continuously separated from the stainless steel endless belt 1. The continuous resin plate 8 is cut to length with an appropriate cutting means (e.g., laser machining, ultrasonic cutting, dicing, or water jet machining) to obtain the resin plate of the invention.

Where the resin plate is used as a transparent substrate of an LCD, it preferably has a thickness of 500 μm or smaller, particularly 100 to 400 μm, especially 200 to 300 μm to facilitate size and weight reduction of an LCD while securing sufficient structural strength. The thickness variation is preferably within ±15 μm, still preferably ±10 μm. The term "thickness variation" as used herein means the deviation of the maximum and the minimum thicknesses from the average thickness in the machine direction measured for every 60 mm and in the transverse direction measured on equally spaced 10 points.

The LCD using the thus prepared transparent resin plate as a substrate in place of a conventionally employed glass plate is produced in a conventional method using a glass plate. That is, a transparent conductive film, a color filter, a liquid crystal alignment layer, and so forth are successively formed on the transparent resin plate to set up a liquid crystal cell, and a liquid crystal material is sealed into the cell to make an LCD.

Application of the resin plate of the invention is not limited to the above-mentioned transparent substrate of LCD's and additionally includes touch panels, electromagnetic wave sealing materials, covers of solar cells, and the like.

The present invention will now be illustrated in greater detail with reference to Examples in view of Comparative Examples, but it should be understood that the invention is not construed as being limited thereto. The epoxy resins, acid anhydride type curing agents, and cure accelerator used in Examples and Comparative Examples are shown below.

Epoxy Resin A

Alicyclic epoxy resin represented by formula (IV) which is solid at room temperature (epoxy equiv.: 185):

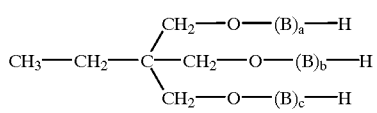

(IV)

wherein B represents a cyclohexane skeleton of formula:

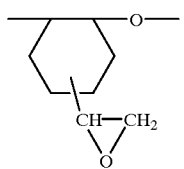

and a, b, and c represent integers satisfying the relationship:

$a+b+c=15$.

Epoxy Resin B

Alicyclic epoxy resin represented by formula (III) (epoxy equiv.: 145).

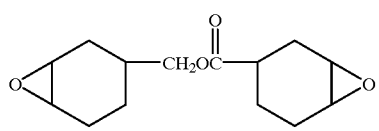

(III)

Acid Anhydride Type Curing Agent A

Prepared by partially esterifying 4-methylhexahydrophthalic anhydride with the cyclic alcohol represented by formula (I) at a hydroxyl group to acid anhydride group equivalent ratio of 0.3:1. The specific weight ratios are shown in parentheses in Table 1 below.

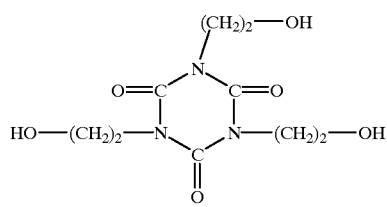

(I)

Acid Anhydride Type Curing Agent B
  4-Methylhexahydrophthalic anhydride
Cure Accelerator
  Tetra-n-butylphosphonium o,o-diethylphosphorodithioate

EXAMPLES 1 TO 5 AND COMPARATIVE EXAMPLES 1 AND 2

The components shown in Tables 1 and 2 below were compounded in the ratio shown and melt-kneaded to prepare an epoxy resin composition.

TABLE 1

| Composition (part by | Example No. | | | | |
|---|---|---|---|---|---|
| weight) | 1 | 2 | 3 | 4 | 5 |
| Epoxy resin A | 28 | 39 | 46 | 56 | 69 |
| Epoxy resin B | 72 | 61 | 54 | 44 | 31 |
| Curing agent A | 126 | 122 | 120 | 116 | 112 |
| (4-methylhexahydro-phthalic anhydride) | (110) | (106) | (104) | (101) | (97) |
| (cyclic alcohol (I)) | (16) | (16) | (16) | (15) | (15) |
| Cure accelerator | 1 | 1 | 1 | 1 | 1 |

TABLE 2

| Composition (part by | Comparative Example No. | |
|---|---|---|
| weight) | 1 | 2 |
| Epoxy resin A | 0 | 100 |
| Epoxy resin B | 100 | 0 |
| Acid anhydride type curing agent B | 124 | 80 |
| Cure accelerator | 1 | 1 |

The viscosity (25° C.) of the resulting epoxy resin compositions are shown in Table 3. The viscosity was measured with an E-type rotational viscometer.

A transparent resin plate was prepared from each epoxy resin composition according to the system shown in FIG. 1 under conditions of 25° C. and a belt running speed of 5 m/min. The resin plate was cut to size by laser machining to obtain a transparent resin plate for an LCD. The thickness (average and variation as measured by the above-described method), Tg, light transmission percentage, and appearance of the resulting resin plate are shown in Table 3.

TABLE 3

| | Example | | | | | Compara. Example | |
|---|---|---|---|---|---|---|---|
| | 1 | 2 | 3 | 4 | 5 | 1 | 2 |
| 25° C. Viscosity (P) | 50 | 75 | 93 | 150 | 400 | 2 | 600 |
| Thickness Variation (μm) | ±15 | ±8 | ±8 | ±8 | ±15 | ±40 | ±8 |
| Average Thickness (μm) | 400 | 400 | 400 | 400 | 400 | 400 | 400 |
| Tg (° C.) | 180 | 183 | 180 | 183 | 183 | 183 | 180 |
| Light Transmission (%) | 95 | 94 | 95 | 95 | 95 | 94 | 95 |
| Appearance | good | good | good | good | good | good | poor |

As is shown in Table 3, all the resin plates prepared in Examples and Comparative Examples were satisfactory in terms of Tg and transparency and had an average thickness of 400 μm. With respect to thickness variation, the resin plates of Examples 1 to 5 were superior to that of Comparative Example 1. Above all, those of Examples 2 to 4 had satisfactory thickness uniformity owing to the viscosity of the resin composition falling within the preferred range. Although the resin plate of Comparative Example 2 was satisfactory in thickness uniformity, its appearance as observed with the naked eye was poor due to entrapment of air bubbles.

An LCD was produced by using each of the resulting transparent resin plates in accordance with a conventional method using a glass plate. The LCD's produced by using the transparent resin plates of Examples exhibited excellent display characteristics, such as freedom from color unevenness and luminous intensity unevenness, as compared with those produced by using the comparative resin plates.

While the invention has been described in detail and with reference to specific examples thereof, it will be apparent to one skilled in the art that various changes and modifications can be made therein without departing from the spirit and scope thereof.

The entire disclosure of each and every foreign patent application from which the benefit of foreign priority has been claimed in the present application is incorporated herein by reference, as if fully set forth below.

What is claimed is:

1. An epoxy resin composition for casting to produce a resin plate, which has a viscosity of from 50 to 400 P at 25° C. and comprises (A) an epoxy resin and (B) a curing agent selected from the group consisting of an acid anhydride and a partially esterified acid anhydride, wherein the epoxy resin as component (A) comprises an epoxy resin that is solid at room temperature in a proportion of 25 to 70% by weight based on component (A).

2. An epoxy resin composition according to claim 1, wherein the acid anhydride type curing agent as component (B) is an acid anhydride partially esterified with an alcohol.

3. An epoxy resin composition according to claim 2, wherein the alcohol is represented by formula (I):

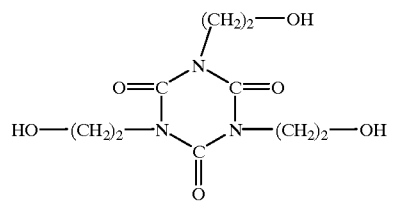

4. An epoxy resin composition according to claim 1, which has a viscosity of from 75 to 150 P at 25° C.

5. A resin plate comprising a cured resin obtained by curing the epoxy resin composition according to claim 1.

6. An epoxy resin composition for casting to produce a resin plate, which has a viscosity of from 50 to 400 P at 25° C. and comprises (A) an epoxy resin and (B) a curing agent selected from the group consisting of an acid anhydride and a partially esterified acid anhydride, wherein the curing agent as component (B) is an acid anhydride partially esterified with an alcohol, which is prepared by allowing 0.1 to 0.6 equivalent of the hydroxyl group of the alcohol to react per equivalent of the acid anhydride group of the curing agent.

7. A resin plate comprising a cured resin obtained by curing the epoxy resin composition according to claim 6.

* * * * *